Sept. 3, 1957     E. S. WEIBEL     2,805,021
ELECTRONIC ANALOGUE MULTIPLIER

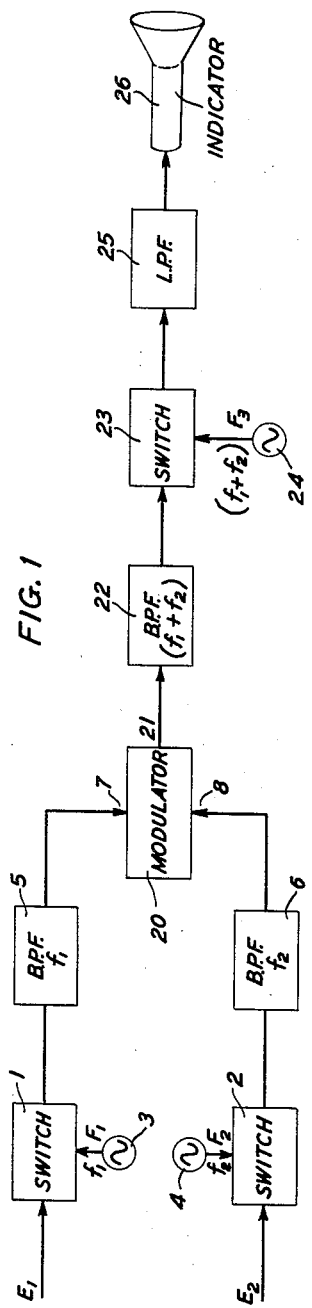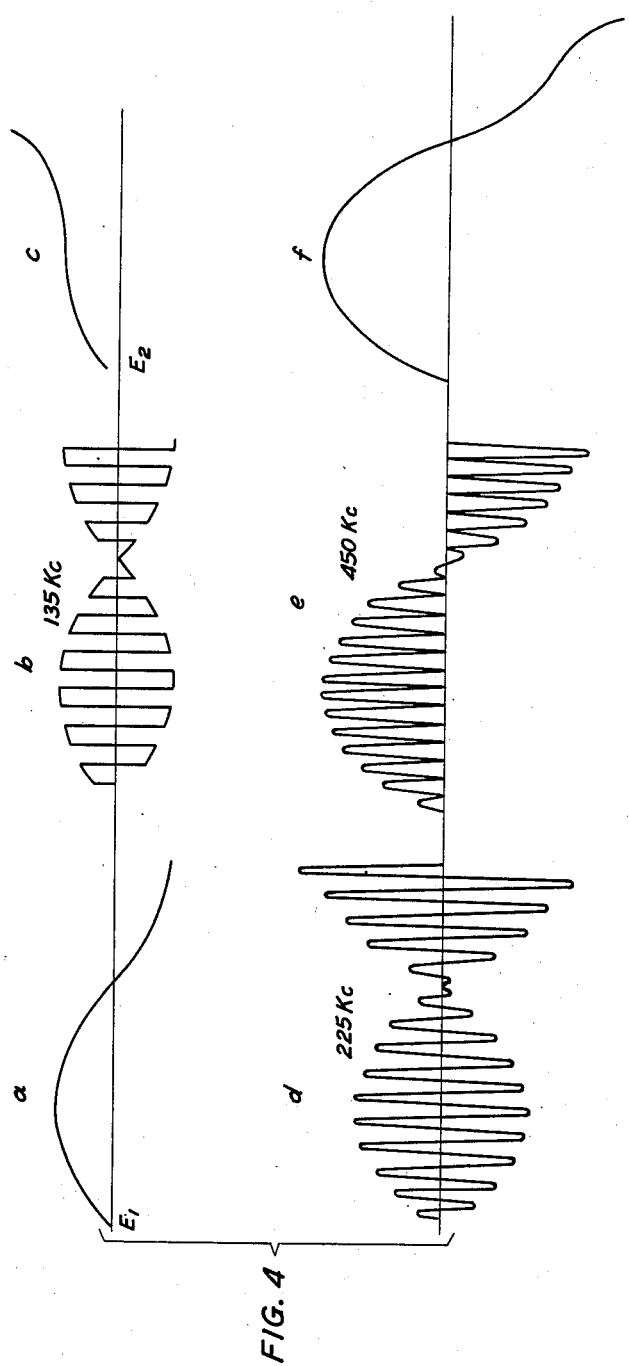

Filed June 27, 1956     2 Sheets-Sheet 2

INVENTOR
E. S. WEIBEL
BY Hugh S. Wertz
ATTORNEY

United States Patent Office 2,805,021
Patented Sept. 3, 1957

2,805,021

ELECTRONIC ANALOGUE MULTIPLIER

Erich S. Weibel, Summit, N. J., assignor to Bell Telephone Laboratories, Incorporated, New York, N. Y., a corporation of New York Application June 27, 1956, Serial No. 594,225

13 Claims. (Cl. 235—61)

This invention relates generally to electronic devices for performing mathematical operations. Particularly, the invention relates to an analogue system for generating the product of two or more factors represented by electrical signals.

The problem confronted by this invention has been attacked by various devices in the past. Many of these devices have directly multiplied input signals in translating elements having approximately parabolic or "square-law" response characteristics. While elements are available which have response characteristics closely approximating the desired parabolic form, nonetheless all of them have sufficient amounts of higher order departures from the ideal characteristic to introduce significant errors into the resulting product signals.

Moreover, such devices have in the past suffered from additional operational disadvantages. Some of them have been restricted in their ability to accept low frequency input signals ranging toward a zero frequency because of drifts in circuit component values. These drifts have led to variations in voltage reference levels to affect adversely product accuracy. Further, these multipliers have been open to the objection that the product signals which they derive are absolute, rather than signed, quantities.

Accordingly, it is a general object of this invention to establish with increased accuracy the product of input signals and to impart a correct algebraic sign to the absolute value of that product. It is a still further object of the invention to extend to zero the frequency range of signals to which a multiplying device may accurately respond.

The invention will be fully apprehended from the following detailed description of an illustrative embodiment thereof taken in connection with the appended drawings, in which:

Fig. 1 is a block diagram showing a multiplier embodying the principles of this invention;

Fig. 4 is a group of waveform diagrams of assistance in the exposition of the circuit shown in Fig. 2.

Figure 3:
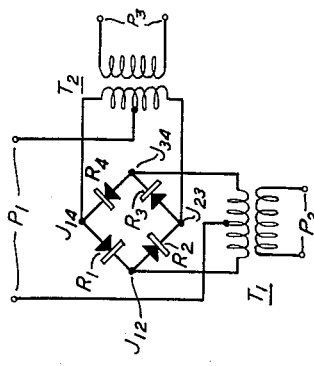
Fig. 3 is a circuit diagram showing an important element of the embodiment of the invention shown in Figs. 1 and 2.

Referring now with more particularity to the drawings, Fig. 1 indicates two factor signals, $E_1$ and $E_2$, derived from sources not shown. These factor signals are applied respectively to two signal-operated inverting switches 1 and 2. For the moment, only the first of these factor signals, $E_1$, will be considered.

A source 3 generates a control signal $F_1$ at a frequency $f_1$. This control signal is applied to the first inverting switch 1 to cause successive reversals of input signals applied thereto. Thus, the factor signal $E_1$ applied to the switch is converted into a train of alternately positive and negative pulses having a repetition rate determined by the frequency $f_1$ of the control signal. Accordingly, the train has an envelope which is of an amplitude directly proportional to the amplitude of the input factor signal $E_1$ and which is also symmetrical about a zero reference line. This symmetry disposes of any adverse effect a drifting potential reference level might have upon the accuracy of the multiplication to be performed.

From the switch 1 the pulse train is sent through a bandpass filter 5 adapted to block frequencies removed from the frequency $f_1$ of the control signal. By the action of this bandpass filter, the input factor signal $E_1$ is converted into an intermediate signal of oscillatory form having an amplitude directly related to it. This intermediate signal is thence applied to an input point 7 of a balanced, square-law modulator 20.

A second source 4 generates a second control signal $F_2$ of frequency $f_2$. This control signal $F_2$ is applied, along with the second factor signal $E_2$, to a second inverting switch 2 from which an output connection is made through a second bandpass filter 5 to a second input point 8 of the modulator 20. Thus, here applied is a second intermediate signal of oscillatory form and of an amplitude directly related to that of the factor signal $E_2$.

In the modulator 20 the two intermediate signals are combined and appear at an output conductor of the modulator as still another oscillatory signal having a plurality of frequency components. Because of the approximate square-law response characteristic of the modulator, one of the components of this output signal is given by the expression $$kE_1E_2 \sin 2\pi(f_1+f_2)t \tag{1}$$

and a second by the term $$kE_1E_2 \sin 2\pi(f_1-f_2)t \tag{2}$$

where $k$ is a constant of proportionality and $t$ represents time. But, because the response characteristic of the modulator only approximates an ideal parabolic curve, other frequency terms also appear as components of the modulator output signal. These other terms represent distortions or inaccuracies in the desired product signal.

By proper choice of the frequencies $f_1$ and $f_2$, however, these distortion-frequency components of the modulator output signal are separated on the frequency scale from the desired product signal, the sum-frequency signal given by Expression 1 above. Hence, as the modulator output signal is applied to a bandpass filter 22, adapted to block frequencies removed from the sum frequency $f_1+f_2$, all distortion components are eliminated.

This distortionless signal passes from the bandpass filter to a third inverting switch 23. As can be seen from Expression 1 above, the envelope of the filtered modulator output signal is directly proportional in amplitude to the product of the two input signals $E_1$ and $E_2$. This signal being oscillatory, however, is, to a close approximation, symmetrical about a zero reference and has no significant sense.

To impart this sense to the signal, the invention provides a source 24 of a third control signal $F_3$ having a frequency $f_3$ equal to the sum of the first two control signals $(f_1+f_2)$. Appropriate connections are made from this third control signal source to operate the third inverting switch 23 in response to this third control signal. Thus, speaking of an illustrative case, the portions of the modulator output signal which have a negative-going sense as they are applied to the inverting switch are reversed and are converted by the switch to positive signals. The positive segments of the product signal are meanwhile undisturbed in sense. Thus, the distortionless modulator output signal is reconstituted as a train of pulses, now asymmetrical about a zero reference line, having a repetition rate equal to twice the sum of the first two control frequencies, i. e., a rate $2(f_1+f_2)$.

It is well here to observe that, in accordance with the invention, elements adapted to a frequency corresponding to the difference of the two control frequencies may be employed throughout. In widening the frequency separation of the desired product signal from distortion components, however, the sum frequency $(f_1+f_2)$ offers some advantages. Recognizing this, the remainder of the discussion will be confined to the sum frequency elements.

The high frequency components of the undistorted train, i. e., those components stemming from the control signal frequencies $f_1$ and $f_2$, are eliminated by passing the train through a low pass filter 25 adapted to block components of frequency $f_2$ and higher. Thence, the signal is applied to a suitable utilization apparatus, e. g., the cathode ray tube indicator 26, as a (relatively) slowly varying signal proportional in amplitude to the product of the two input factor signals $E_1$ and $E_2$ and having a sense determined by the sense of that product.

Figure 2:
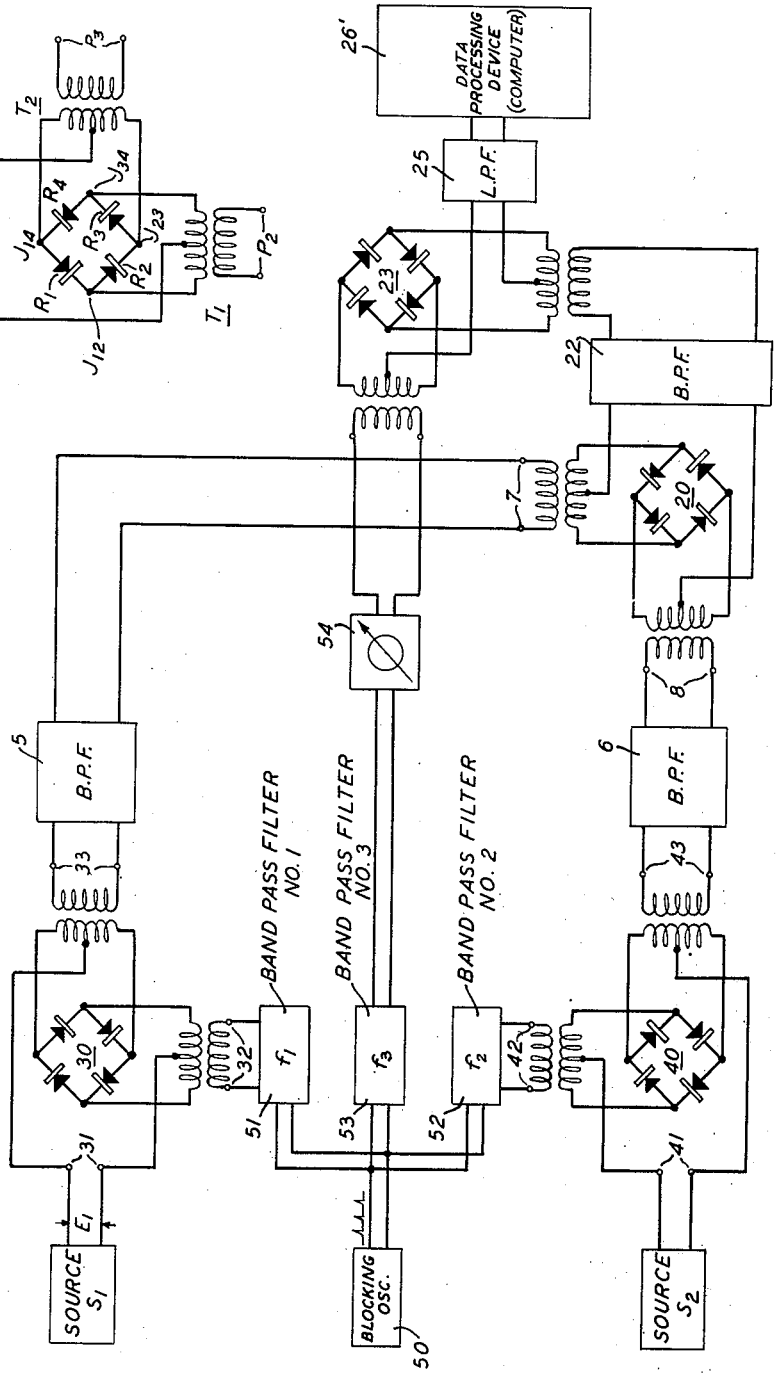
Fig. 2 is a more detailed schematic circuit diagram of the system shown in Fig. 1.

Turning next to Fig. 2, there are shown details of the circuitry employed to effect an analogue multiplication such as outlined in consideration of Fig. 1. Two sources, $S_1$ and $S_2$, which may be any one of many devices known in the art, convert two quantities to be multiplied into electrical signals $E_1$ and $E_2$, illustrated in Figs. 4a and 4c, having no frequency components higher than, for example, five kilocycles, and an amplitude less than two volts. The first signal $E_1$ is applied to a first external terminal pair 31 of a well-known copper oxide bridge modulator 30 here employed as a reversing switch.

A blocking oscillator 50 generates a train of pulses, rich in harmonics, at a rate conveniently high with respect to the input signals $E_1$ and $E_2$, say 45 kilocycles. This train of pulses is applied in parallel to three bandpass filters 51, 52, 53 adapted to pass frequencies of the third, second and fifth harmonics of the pulse repetition frequency. From the first filter a sine wave $F_1$ of large amplitude, say 10 volts, having a frequency $f_1$ of 135 kilocycles, is applied to a second pair of terminals 32 associated with the copper oxide rectifier bridge.

In like fashion, the second input factor signal $E_2$ and a 90 kilocycle, 10 volt sine wave $F_2$, derived from the second filter 52, are applied to a second copper oxide rectifier bridge 40.

Turning attention for the moment to Fig. 3, there is seen a detailed circuit diagram illustrating the connections to a copper oxide rectifier bridge as employed in the invention. Four copper oxide rectifying elements $R_1$, $R_2$, $R_3$, $R_4$, polarized as indicated, are connected in a series loop. The secondary windings of two transformers $T_1$ and $T_2$ are respectively connected to different pairs of diagonally opposite junctions $J_{12}$, $J_{34}$ and $J_{14}$, $J_{23}$, of pairs of the rectifier elements thus to form a rectifier bridge. A first pair of external bridge terminals $P_1$ are connected to the center points of the secondary windings of each of these transformers. The primary windings of the two transformers provide a second and a third external terminal pair connection $P_2$, $P_3$ to the rectifier bridge.

This bridge has two modes of operation, a small signal mode and a large signal mode. If, for example, small signals, say signals less than two volts, be applied to the second and third terminal pairs $P_2$ and $P_3$, then an intermodulation amplitude product signal appears at the first external terminal pair $P_1$.

In the small signal range the rectifier elements exhibit an approximate square-law response characteristic. Accordingly, the modulator output signal contains a component proportional in amplitude to the amplitude product of the two input signals and having a frequency equal to the sum of the frequencies of the two input signals applied to the two transformer primary windings. The fact that the copper oxide elements depart from a true parabolic response, however, leads to still other output components having various frequencies. These frequencies are combinations of several harmonics of the frequencies comprising the input signals. These harmonic components act to distort the output signal, here the signal appearing at the first terminal pair, such that it no longer represents a true product of the input signals.

The modulator shown in Fig. 3 operates in an entirely different fashion under the influence of large signals. Suppose, for example, a large signal of the order of 10 volts is applied through the first transformer $T_1$ to diagonally opposite junction points $J_{12}$, $J_{31}$ of the bridge with a polarity instantaneously positive from left to right. An illustrative low level signal applied in like sense to the first bridge terminal pair $P_1$ now finds in the bridge arm including the rectifier element $R_2$ an effective zero impedance. This results from the fact that this element $R_2$ is now voltage-saturated. Accordingly, the entire low level signal applied to the first input terminal pair $P_1$ appears at the third output terminal pair $P_3$ with a given polarity. If, then, the polarity of the large signal be reversed, the polarity of the low level output signal is similarly reversed, though its amplitude remains equal to the input low level signal. Thus, in the large signal mode of operation the rectifier bridge is an effective switch.

Returning now to consideration of Fig. 2, and directing attention first to the switch 30 and its associated circuits, the large amplitude sine wave $F_1$ derived from the first bandpass filter 51 is applied to input terminals 32 of that switch corresponding to the second terminal pair $P_2$ of Fig. 3. The first input factor signal $E_1$ having a waveform as illustrated in Fig. 4a is applied to the terminals 31 of the first switch which correspond to the first terminal pair $P_1$ of Fig. 3. In the employment of this connection to the bridge the invention achieves an important objective since such direct connection allows this multiplier to accept a factor signal having a low variation rate; indeed, a zero variation rate. Whence, however low its variation rate, this factor signal $E_1$, under the influence of the large signal $F_1$, is converted at the third terminal pair 33 of the rectifier bridge into a series of pulses.

These pulses are, as illustrated in Fig. 4b, alternately inverted in sense at the 135 kilocycle rate of the control signal $F_1$, derived from the first bandpass filter 51, and have amplitudes equal to the corresponding instantaneous amplitude of the first input factor signal. This train of pulses is approximately symmetrical about a zero reference line and hence is free from the drift errors which, as has been said, have affected the accuracy of prior multipliers. The train passes through another bandpass filter 5 adapted to block signals at frequencies substantially removed from the frequency $f_1$ at which the first switch 30 is operated. This filter 5 transforms the signal of Fig. 4b into an intermediate oscillatory signal having an amplitude proportional to the amplitude of the input factor signal $E_1$ and a frequency equal to the inverting control signal frequency $f_1$.

This intermediate signal is now applied to a balanced modulator 20, identical in structure to the switches heretofore discussed, at an input point 7 corresponding to the second terminal pair shown in Fig. 3.

In like fashion, the second bandpass filter 52 supplies a large amplitude sine wave $F_2$ to control the operation of a second copper oxide bridge inverting switch at a frequency $f_2$ equal to the second harmonic frequency of the output signal of the blocking oscillator 50. (Thus, for reasons which presently will appear, the two input factor signals are inverted successively at rates $f_1$ and $f_2$ related in the ratio 3:2.) Thereafter, the second factor signal $E_2$ is converted to a second intermediate oscillatory signal and applied to a second input point 8 of the modulator 20 corresponding to the third terminal pair of Fig. 3.

The two intermediate signals, being limited in amplitude to the small signal level of the factor signals $E_1$ and $E_2$, are multiplied in the modulator. As earlier considered, the resulting product signal appears at the modulator output conductor as a signal, illustrated in Fig. 4d, having one component given by Expression 1.

Now appears the significance of the choice of the ratio of the two switching control signal frequencies. In consideration of Fig. 3, the response characteristic of the modulator, it was said, departs from an exact square-law parabola. Hence, in a generalized case the formation of intermodulation products between two input signals combined in an imperfect modulator yields various harmonic distortion components in the output signal. Below are tabulated some of the ratios with respect to an arbitrary reference frequency $f_0$, which might be chosen between frequencies of the two switching control signals together with some of the intermodulation product frequencies which arise from such ratios.

| Modulation Products | | Ratio $f_1:f_2:f_0$ | | |
|---|---|---|---|---|
| | | 3:2:1 | 1:1:1 | 2:1:1 |
| Product Frequencies | $f_1+f_2$ | $5f_0$ | $2f_0$* | $5f_0$* |
| | $f_1-f_2$ | $f_0$ | 0 | $f_0$ |
| 2nd Order Distortion Frequencies | $2f_1$ | $6f_0$ | $2f_0$* | $4f_0$ |
| 3rd Order Distortion Frequencies | $2f_1-f_2$ | $4f_0$ | $f_0$ | $3f_0$ |
| | $2f_1+f_2$ | $8f_0$ | $5f_0$ | $5f_0$* |

*Indicates distortion signal paired in frequency with true product signal.

Cursory inspection of this tabulation reveals that the 3:2 ratio of the two switching frequencies is especially advantageous in that it admits of no harmonic intermodulation within the frequency band given by $f_1+f_2$ in the Expression 1 above. Similar arithmetic tabulations show that non-integral ratios of switching frequencies yield distortion products having frequencies near the frequency $f_1+f_2$ of the true product signal.

In accordance with a feature of the invention, however, the frequencies $f_1$ and $f_2$ of the two intermediate signals are established at values, 135 kilocycles and 90 kilocycles, which bear the desirable relationship of 3:2. Hence, as the modulator output signal is applied to a bandpass filter 22 adapted to block frequencies removed from the frequency $(f_1+f_2)$, its significant error components are eliminated. The modulator product signal then emerges from the bandpass filter in an oscillatory form as illustrated in Fig. 4d. This illustrated wave is applied to still a third reversing switch 23.

Meanwhile, a third control signal $F_3$ is derived from the blocking oscillator 50 by way of the bandpass filter 53 at a frequency $f_3$ equal to the sum of the frequencies of the first two control signals. This third control signal, through appropriate connections, serves to actuate the third inverting switch 23 at exactly the frequency of the now distortionless, filtered modulator product signal.

An adjustable phase shifting network 54 is connected between the third bandpass filter 53 and the third switch 23. Hence, though it need not be so, in this preferred embodiment of the invention the third control signal is applied to the third reversing switch 23 in exact phase coincidence with the oscillatory product signal. Thus, the third inverting switch operates to convert the oscillatory product signal shown in Fig. 4d into a succession of semi-sinusoidal arcs illustrated in Fig. 4e, each of which arcs has a sense determined by the instantaneous sense of the product of the input factor signals.

While in this preferred embodiment of the invention exact phase coincidence of the third control signal with the distortionless product signal is established, it is worthy here to note that even without this exact coincidence, the sense-establishing ability achieved by the invention remains. The envelope amplitude of the semi-sinusoidal arc signal itself varies sinusoidally with a phase displacement between the third control signal and the filtered product signal, but if this displacement be maintained constant the sense information content and the accuracy of the output product signal are not disturbed. There is merely a variation of the proportionality constant which relates the envelope amplitude of the semi-sinusoidal arc signal to the desired factor product.

From the third inverting switch 23 the product signal, now converted to a series of semi-sinusoidal pulses, is applied to a low pass filter 25 which eliminates frequency components at or above control signal frequencies. Thence, the product signal, now in the form, as illustrated in Fig. 4f, of a continuous signal having a variation rate related to the variation rates of the input factor signals $E_1$ and $E_2$, is applied to suitable utilization apparatus 26' which may take the form of an analogue data processing device.

What is claimed is:

1. Apparatus for multiplying a first factor by a second factor and for deriving a signal proportional to their product which comprises a source of a first signal proportional to said first factor, a source of a second signal proportional to said second factor, means for successively inverting the sense of said first signal at a first rate, $f_1$, substantially higher than the variation rates of said first and second signals, to develop a first intermediate signal, means for successively inverting the sense of said second signal at a lesser rate, $f_2$, substantially higher than the variation rates of said first and second signals, to develop a second intermediate signal, a modulator having a first input point, a second input point and an output conductor, connections for applying said first intermediate signal to said first input point, connections for applying said second intermediate signal to said second input point, whereby said output conductor carries an output signal of a frequency equal to that of a first order modulation product of said intermediate signals, and of an amplitude proportional to the product of said first factor signal by said second factor signal, and means for successively inverting the sense of said output signal at a rate equal to said frequency, thereby to derive a pulsed signal having an envelope proportional to the product of said first factor and said second factor.

2. Apparatus for multiplying a first factor by a second factor and for deriving a signal proportional to their product which comprises a source of a first signal of amplitude proportional to said first factor, a source of a second signal of amplitude proportional to said second factor, means for successively inverting the sense of said first signal at a first rate, $f_1$, substantially higher than the variation rates of said first and second signals to develop a first intermediate signal, means for successively inverting the sense of said second signal at a lesser rate, $f_2$, substantially higher than the variation rates of said first and second signals to develop a second intermediate signal, a modulator having two input points and an output conductor, connections for applying said first intermediate signal to said first input point, connections for applying said second intermediate signal to said second input point, whereby said output conductor carries a signal of a frequency $(f_1+f_2)$ and of an amplitude proportional to the amplitude product of said first factor signal and said second factor signal, and means for successively inverting the sense of said output signal at a rate, $f_1+f_2$.

3. In combination with apparatus as set forth in claim 2, filter means interposed between said output conductor and said last-named inverting means for blocking frequencies substantially removed from the frequency $(f_1+f_2)$ of said output conductor signal.

4. In combination with apparatus as set forth in claim 2, filter means for passing frequencies lower than said second named rate, $f_2$, said filter means being connected in tandem with said last-named inverting means, thereby to derive a final signal proportional to said product.

5. In combination with apparatus as set forth in claim 4, means for utilizing said final signal, said utilizing means being connected in tandem with said low frequency passing means.

6. Apparatus as set forth in claim 5 wherein said utilizing means comprises a data processing device.

7. Apparatus for establishing a signal proportional to the product of a first factor signal and a second factor signal which comprises means for generating a first control signal having a frequency, $f_1$, substantially higher than the variation rates of said factor signals, signal-controlled means for repetitively inverting the sense of said first factor signal, means for generating a second control signal having a lesser frequency, $f_2$, substantially higher than the variation rates of said factor signals, signal-controlled means for repetitively inverting the sense of said second factor signal, connections for applying said first and second control signals to said first and second named inverting means respectively, thereby to derive a first intermediate signal having a frequency, $f_1$, and to derive a second intermediate signal having a frequency, $f_2$, modulating means having a first input circuit and a second input circuit, connections for applying said first intermediate signal and said second intermediate signal to said first input circuit and to said second input circuit respectively, whereby said modulating means combine said intermediate signals to derive an output signal having a component corresponding in frequency to the sum, $f_1+f_2$, of said control signal frequencies and proportional in amplitude to the product of said factor signals, means for generating a third control signal having a frequency equal to the sum, $f_1+f_2$, of said first and second control signal frequencies, signal-controlled means for repetitively inverting the sense of said output signal, and connections for applying said third control signal to said last-named inverting means, thereby to operate said last-named inverting means at a rate, $f_3$, whereby said output signal is converted into a product signal consisting in a succession of pulses having an envelope proportional to the product of said first factor signal and said second factor signal.

8. In combination with apparatus set forth in claim 7, means for adjusting the phase of said third control signal in relation to the phase of said output signal, thereby to optimize the proportion between said product signal and said product.

9. In combination with apparatus as set forth in claim 7, filter means connected in tandem with said last-named inverting means for blocking frequencies substantially higher than the variation rate of said factor signals, thereby to derive a final signal proportional to said envelope.

10. Apparatus as set forth in claim 7, wherein said first control signal frequency, $f_1$, is related to said second control signal frequency, $f_2$, and to said third control signal frequency, $f_3$, in the proportions 3:2:5.

11. Apparatus as set forth in claim 7, wherein at least one of said input circuits comprises filter means for blocking frequencies substantially removed from a corresponding one of said intermediate frequencies.

12. An analogue multiplier for deriving a signal proportional to the product of a first factor and a second factor comprising means for deriving a first oscillatory signal having an amplitude proportional to said first factor and a frequency, $f_1$, substantially higher than the variation rates of said factors, means for deriving a second oscillatory signal proportional to said first factor and having a frequency, $f_2$, substantially higher than the variation rates of said factors, balanced modulating means having a first input circuit and a second input circuit, connections for applying said first oscillatory signal to said first input circuit, connections for applying said second oscillatory signal to said second input circuit, whereby said oscillatory signals are combined to derive an output signal having an amplitude proportional to the amplitude product of said factors and having a frequency corresponding to the sum of said first and second named frequencies, and means for repetitively inverting the sense of said output signal, at a rate equal to the sum of said first and second oscillatory signal frequencies.

13. Apparatus as set forth in claim 12, wherein said oscillatory signal deriving means comprises a rectifier bridge having four rectifying elements serially connected, means for deriving an input signal proportional to said first factor, and means for applying said input signal directly between the junctions of opposite pairs of said elements.

No references cited.